C. J. COBERLY.
OXYHYDROGEN CUTTING TORCH.
APPLICATION FILED APR. 1, 1919.
1,340,699.
Patented May 18, 1920.
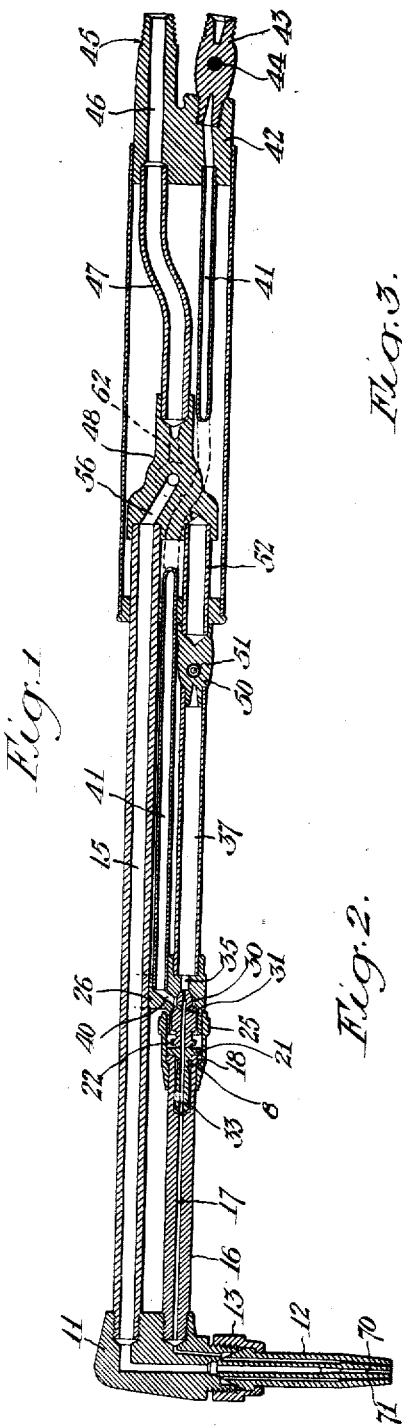
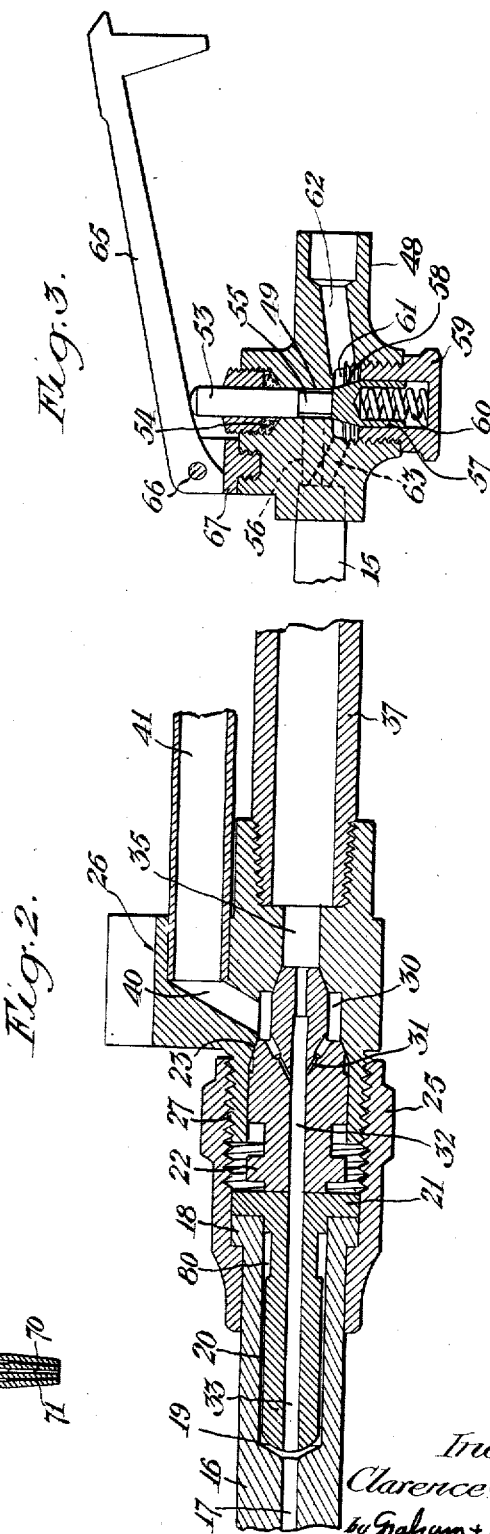
Inventor
Clarence J. Coberly
by Graham + Lewis
Attorneys

UNITED STATES PATENT OFFICE.

CLARENCE J. COBERLY, OF LOS ANGELES, CALIFORNIA, ASSIGNOR TO CALIFORNIA BURDETT OXYGEN COMPANY, A CORPORATION OF CALIFORNIA.

OXYHYDROGEN CUTTING-TORCH.

1,340,699.　　　　　Specification of Letters Patent.　　Patented May 18, 1920.

Application filed April 1, 1919. Serial No. 286,757.

*To all whom it may concern:*

Be it known that I, CLARENCE J. COBERLY, a citizen of the United States, residing at Los Angeles, in the county of Los Angeles and State of California, have invented a new and useful Oxyhydrogen Cutting-Torch, of which the following is a specification.

My invention relates to oxy-acetylene cutting torches, and the objects of the invention are to provide a novel form of mixer and a novel form of control valve for use in such torches.

Referring to the drawings, which are for illustrative purposes only,

Figure 1 is a sectional elevation through a torch embodying my invention.

Fig. 2 is an enlarged section through the mixer, and

Fig. 3 is an enlarged section through the valve.

In the form of torch shown, a head 11 is provided in which a tip 12 is seated by means of a retaining nut 13. Threaded in the head 11 is a primary oxygen pipe 15 and a mixed gas pipe 16. The mixed gas pipe 16 has a small opening 17 therethrough and a flange 18 formed on the end thereof. Seated in a recess 19 inside the end 18 is an explosion plug 20, this plug having a head 21 of approximately the same diameter as the flange 18 and fitting inside the recess 19 in such a manner as to leave a free annular explosion space therearound.

Abutting against the rear of the explosion plug 20 is a mixing plug 22, this plug having a conical seat 23 at the rear end thereof, the parts 18, 21 and 22 being forced together and the member 22 being forced against its seat 23 by means of a compression nut 25. The compression nut 25 is threaded on a body 26 having a conical seat coöperating with the seat 23 and having an external thread 27 on which the nut 25 is threaded.

Formed in the mixing plug 22 and in the body 26 are cavities which coöperate to form an annular space 30 which surrounds the mixing plug 22 and which communicates through small openings 31 with a central opening 32 formed in the mixing plug 22. The explosion plug 20 has a small central opening 33, the openings 32, 33 and 17 forming a continuous passage which communicates with an opening 35 formed in the head 25 which is in open communication with a secondary oxygen pipe 37 which is threaded therein. The annular space 30 communicates through an opening 40 with a hydrogen pipe 41. The hydrogen pipe 41 passes to the rear of the torch, being secured in an end casting 42 which is provided with a nipple 43 having a hydrogen shut-off valve 44 carried therein. A flexible hydrogen supply pipe (not shown) is attached to the outer end of the nipple 43 in accordance with standard practice in the art. Formed on the casting 42 is a threaded extension 45 to which a flexible oxygen supply pipe (not shown) is attached in accordance with standard practice in the art. An opening 46 through the extension 45 is in open communication with a tertiary oxygen pipe 47 which connects into a valve body 48.

The secondary oxygen pipe 37 connects into a shut-off valve body 50 which is provided with a shut-off valve 51, the shut-off valve body 50 being connected through a nipple 52 with the valve body 48. The valve body 48 is provided with a central opening 49 in which a valve stem 53 is free to slide, this valve stem being surrounded by a stuffing box gland which is used to compress packing 54 about the stem 53 and to render it gas tight. The stem 53 is turned down as shown at 55 so that an annular opening is formed therearound inside the opening 49.

The primary oxygen pipe 15 communicates with this annular opening through a channel 56. A valve 57 having a conical end 58 is provided, this valve sliding in a cap 59 and being forced upwardly in the petition shown in Fig. 3 by means of a compression spring 60. The cap 59 is threaded in the body 48 and an annular opening 61 is left above the cap 59, this annular opening 61 communicating through a channel 62 with the tertiary oxygen pipe 47. The annular space 61 also constantly communicates through an opening 63 with the pipe 52, the communication between the pipe 52 and the pipe 47 being always open and the gas being taken through this opening merely as a matter of construction. A lever 65, pivoted on a pin 66 carried on a threaded plug 67, is used to operate the valve stem 52.

The method of operation of my invention is as follows:

Oxygen being supplied to the opening 46 and hydrogen being supplied to the interior of the nipple 43 through flexible pipes in accordance with standard practice, the supply of these gases can be controlled as follows:

The hydrogen supply can be shut off at all times by means of the valve 44 and the oxygen supply through the pipe 37 can be shut off at all times by means of the valve 51. The oxygen supply to the pipe 15 is normally shut off at all times by means of the valve 57. The tip 12 is provided with a central passage 70 through which oxygen is supplied for cutting purposes, and with a plurality of exterior openings 71 through which mixed gas is supplied for heating purposes. The valve 57 is controlled by means of the grip 65 for the purpose of regulating the amount of oxygen supplied for cutting purposes, no oxygen being supplied until the lever 65 is pressed down.

With the parts in the position shown in Fig. 3, the valve 57 is forced upwardly by the spring 60, being seated on the lower edge of the opening 51, thus shutting off all communication between the annular space 61 and the annular space 51. This prevents oxygen from flowing into the pipe 15, the heating flame alone being used. The hydrogen for the heating flame is supplied through the pipe 41 and the oxygen is supplied through the pipe 37. The oxygen from the pipe 37 passes through the opening 35, the openings 32 and 33, into the opening 17 and from thence into the openings 71 in the tip 12. The hydrogen is supplied through the pipe 41 to the annular space 30 around the mixing plug 22. The hydrogen under pressure is then passed through the small openings 31 into the stream of moving oxygen passing through the opening 32. When it is desired to use the cutting flame the handle 65 is depressed thus opening the valve 57.

The particular advantages of the various forms of construction are more or less obvious. I would call attention, however, to the arrangement of the parts 18 to 26 inclusive, best illustrated in Fig. 2. It might be explained that the explosion plug 20 does not fit tightly in the cavity 19, a small annular opening being left between the exterior of the plug 20 and the interior walls of the pipe 16 which form the cavity 19. An enlarged explosion space 80 is formed in the explosion plug 20 for the purpose of constantly collecting mixed gases which are exploded whenever there is a flash back in the torch, this exlosion tending to force the flame back to the tip and preventing continued combustion inside the torch.

When it is desired to clean any of the parts 20 to 26 it can be readily done by disconnecting the compression nut 25, this nut being slipped along on the pipe 16 so that the various parts can be readily removed by turning the pipe 16 around the pipe 15. With the parts so turned the mixing plug 22 can be readily removed from its seat and the explosion plug 20 can also be readily removed either for replacement, repair or for cleaning. These parts can also be readily replaced and secured by the single nut 25.

The principal novelty in the valve shown in Fig. 3 lies in the construction of the stem 52 and the valve 57 which are made in a separate piece so arranged that the valve seats itself without binding and without regard to the direction of the stem 52.

What I claim is:—

1. A mixer for an oxy-hydrogen torch comprising a body having a seat therein, a mixing plug coöperating with said seat, said body and plug having mutually coöperating openings by which a gas may be delivered to a central mixing opening therein, an explosion plug having a central opening coöperating with said central mixing opening, a pipe into which said explosion plug projects, a head formed on said pipe, a flange formed on said explosion plug of approximately the same outside diameter as said head, and means for simultaneously forcing said head against said flange and making a gas tight seal between said pipe and said body.

2. A mixer for an oxy-hydrogen torch comprising a body having a seat therein, a mixing plug coöperating with said seat, said body and plug having mutually coöperating openings by which a gas may be delivered to a central mixing opening therein, an explosion plug having a central opening coöperating with said central mixing opening, a pipe into which said explosion plug projects, a head formed on said pipe, a flange formed on said explosion plug of approximately the same outside diameter as said head, and a compression nut threaded on said body and engaging said head.

In testimony whereof I have hereunto set my hand at Los Angeles, California, this 26th day of March, 1919.

CLARENCE J. COBERLY.